March 19, 1929. G. W. OAKES 1,706,317
QUICK DETACHABLE APPLIANCE
Filed Feb. 20, 1926
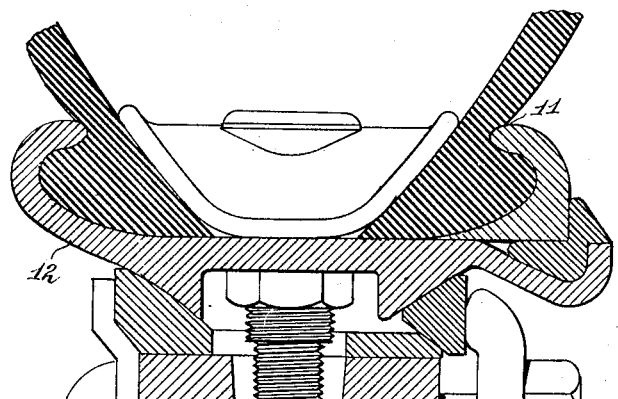
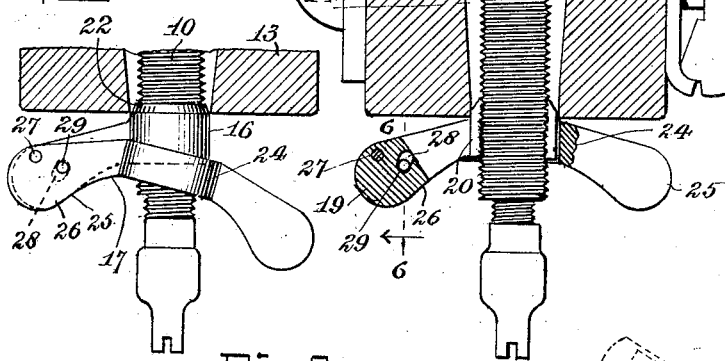
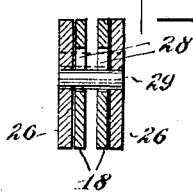
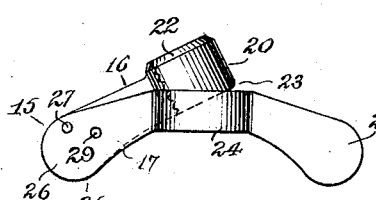
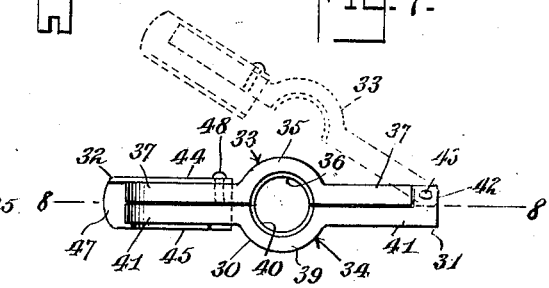
INVENTOR
George W. Oakes.

Patented Mar. 19, 1929.

1,706,317

UNITED STATES PATENT OFFICE.

GEORGE W. OAKES, OF CRYSTAL CITY, MISSOURI.

QUICK-DETACHABLE APPLIANCE.

Application filed February 20, 1926. Serial No. 89,712.

This invention relates to the class of appliances capable of being quickly, easily and effectively applied to a threaded element and quickly and easily detached from such element.

One object of the present invention is to provide an appliance which may be quickly and easily applied to a threaded tire valve stem extending through a radial bore in the rim of a vehicle wheel to effectively hold the valve stem in place against withdrawal radially outward through said bore, and to support the stem in axial alignment in said bore out of contact with the wall of said bore, the said appliance also being quickly and easily detached.

Another object of the invention is the provision of an appliance capable of being quickly and easily applied to a valve stem approximately at the point at which binding action is set up which will be capable of threading adjustment to finally and effectively set up the binding action against portions of the rim of a vehicle wheel through which the stem extends, and which may be quickly detached without requiring unscrewing of the appliance.

The nature of the invention and its distinguishing features and advantages will appear when the following specification is read in connection with the accompanying drawing, in which—

Figure 1 is a transverse sectional view through the rim of a vehicle wheel with a portion of a pneumatic tire structure including the usual valve stem extending through said rim with the appliance of the present invention effectively employed.

Fig. 2 is a side elevation of the appliance on the inner end of the valve stem and showing the retaining element of the appliance moved to a position to permit the parts of the nut element to be separated for the quick detachment of the appliance.

Fig. 3 is a side elevation of the appliance detached.

Fig. 4 is a plan view of the device in the condition shown in Fig. 2.

Fig. 5 is a plan view showing the condition of the appliance when it is applied.

Fig. 6 is a detail sectional view taken on the line 6—6 of Fig. 1.

Fig. 7 is a plan view of a modified form of appliance.

Fig. 8 is a longitudinal sectional view taken on the line 8—8 of Fig. 7.

Fig. 9 is a perspective view of a modified form of retaining means.

The appliance of the present invention is capable of a wide range of application. In the present instance the appliance is shown in use in connection with a threaded valve stem 10 of a pneumatic tire structure, a portion of which is shown at 11, as being supported on the usual demountable rim 12 arranged on the felly or rim 13 of a vehicle wheel. The said valve stem as is usual extends through a radial bore, such as the bore 14 in the felly 13. The bore 14 is somewhat larger in diameter than the valve stem 10 to permit the same to be readily extended therethrough. A tire valve stem is comparatively long in order that it may extend through the felly of the wheel to accommodate the dust cap. Different types of binding nuts have been employed in conjunction with the valve stem to hold the same in place. These types of binding nuts require their being threaded all the way from the free end of the valve stem to the point at which binding action with the felly is set up. In some cases the valve stem is provided with flat sides to accommodate nuts having mutilated threads to effect a quick application and a quick detachment.

The form of appliance 15 shown in Figs. 1 to 6 is capable of application at a point in the length of the valve stem for threading adjustment, which will only require one or two turns of the appliance to set up a binding action, and which can be readily detached from the valve stem without unscrewing the same. Referring now more particularly to the views of the drawing mentioned, it will be apparent that, the appliance comprises an element 16 and an element 17. The element 16 is produced from a single piece of material which is cut and formed to provide members 18 which are connected together as at 19, and flexibly related to each other. Each of the members 18 has a semi-circular portion 20, each of which has threads 21 on the inside thereof. Normally the members 18 bear such a relationship with respect to each other as to dispose the semi-circular portions 20 spaced apart to accommodate therebetween the valve stem 10, but with the threads of the semi-circular portions 20 not in engagement with the threads of the valve stem 10. Each of the semi-circular portions 20 is chamfered or beveled as at 22 for a purpose to appear. Each of the semi-circular portions 20 is rounded as at 23. The retaining member 17, in the present instance, is made from a single piece of material, and is cut and formed to provide an annulus 24 and wings or extensions 25 on the annulus 24 and disposed diametrically opposite each other. One of the wings 25 is divided to provide spaced members 26. The retaining element 17 is pivotally connected to the element 16, and this is accomplished by the employment of a pivot pin 27 or the like which extends through the members 26 and the straight portions of the connected members 18 which are disposed between the members 26. In order to limit the movement of one of the elements 16 and 17 with respect to the other, there is provided a pin and slot connection, a slot 28 is put into each of the straight portions of the members 18, and a pin 29 is supported by the members 26 and extends through the slots 28.

When the element 16, which may be aptly termed a nut element, is in the position shown in Fig. 3, the semi-circular portions 20 are separated sufficiently to accommodate the valve stem 10 therebetween. In this way the appliance is arranged on the valve stem 10 approximately at a point at which a binding action is to be set up. This may be done quickly and easily due to the fact that the threads of the semi-circular portions 20 and the threads of the valve stem 10 are not mutually engaged for threading action. The retaining element 17 is then swung on its pivot 27 which will cause the semi-circular portions 20 to be flexed toward each other due to the fact that their rounded portions 23 will ride on the inner walls of the annulus 24. This relative movement of the retaining element 17 causes the semi-circular portions 20 to embrace the valve stem with the threads of the semi-circular portions mutually engaged with the threads of the valve stem 10 for threading adjustment on the latter. The threading adjustment is accomplished by manipulating the wings 25 until an effective binding action is set up. In this manner the valve stem 10 is securely held in place against radial outward movement, and is also maintained in axial alignment in the bore 14, and is prevented from rubbing against the walls of the bore. This is true because of the fact that the beveled portions 22 enter the bore 14, as shown most clearly in Fig. 1, while the annulus 24 impinges against the felly 13. Sufficient frictional contact is set up between the annulus 24 and the semi-circular portions 20 to hold the element 17 against movement, and it therefore maintains the semi-circular portions 20 in an active relationship on the valve stem 10. When it is desired to detach the appliance from the valve stem it is only necessary to swing the element 17 on its pivot, whereupon the semi-circular portions 20 will flex away from each other and therefore permit the appliance to be detached since the threads of the semi-circular portions 20 will be disengaged from the threads of the valve stem 10. Thus the appliance is removed without unscrewing the same.

In the form of the invention shown in Figs. 7 and 8, the appliance 30 illustrated comprises an element 31 the equivalent of the element 16 of the other form of the appliance, and a retaining element 32, the equivalent of the retaining element 17 of the other form of the appliance. The element 31 comprises a member 33 and a member 34. The member 33 comprises a semi-circular portion 35 having threads 36, and wings 37. One of the wings is provided with an apertured terminal 38. The member 34 is substantially similar to the member 33, and therefore comprises a semi-circular portion 39 having threads 40, and wings 41. One of the wings 41 has a bifurcated extremity 42. The furcations of the extremity 42 each have a hole therein which register with the hole in the terminal 38 when the latter is arranged between said furcations to receive a pin 43 to effect a pivotal connection of the members 33 and 34. It will therefore be understood that the members 33 and 34 may be moved toward and away from each other. When the members 33 and 34 are brought together as shown in Fig. 7, the semi-circular portions 35 and 39 constitute a nut. The semi-circular portions 35 and 39 are maintained in the nut forming relationship by the retaining element 32. The retaining element 32 is stamped, bent and formed from a single piece of material to provide side portions 44 and 45 which are connected together by a portion 46, the latter providing a manipulating end 47. A pivoted pin 48 which passes through the side portion 44 and which extends into the wing 41 of the member 33 constitutes a pivotal connection of the element 32 to the member 33. The side portion 45 of the element 32 is cut as at 49 at an angle so that when the element 32 is swung to an inactive position the members 33 and 34 can have pivotal movement to be either brought together or separated.

From the foregoing it will be apparent that the appliance 30 can be put into use substantially similar to the manner in which the appliance 15 is put into use. The appliance 30 may be quickly applied to the valve stem by swinging the element 42 to the position shown in dotted lines in Fig. 8, whereupon the members 33 and 34 may be separated and then brought together to mutually engage the threads 36 and 40 respectively of the portions 35 and 39 with the threads of the valve stem. The retaining element 32 is then moved to an active position to maintain the nut forming relationship of the portions 35 and 39. By turning the appliance in this condition it may be adjusted on the stem to set up the desired binding action.

I claim:

1. An appliance comprising an element split to provide flexibly related members having semi-circular threaded portions which may be brought together in coacting relationship to form a nut for threading adjustment on a threaded element, and means pivoted on said split element and adapted to embrace and to exert pressure on both of said members when moved into the plane of said members, to maintain them in the coacting relationship, said means being movable on its pivot to a position to permit said members to flex their threaded portions out of threading engagement with said threaded element, so that the appliance may be quickly moved endwise off the threaded element.

2. An appliance comprising an element split to provide flexibly related members having semi-circular threaded portions which may be brought together in coacting relationship to form a nut for threading adjustment on a threaded element, and means pivoted on said split element and adapted to embrace and to exert pressure on both of said members when moved into the plane of said members, to maintain them in the coacting relationship, said means being movable on its pivot to a position to permit said members to flex their threaded portions out of threading engagement with said threaded element, so that the appliance may be quickly moved endwise off the threaded element, and means limiting the pivotal movement of said last mentioned means away from said members.

3. An appliance comprising members provided with threaded portions, said members being flexibly connected together for relative movement so that their threaded portions will normally assume relative positions to be movable endwise with respect to a threaded element into and out of association therewith, and pivoted means adapted to flex and to clampingly engage said members to maintain said threaded portions in engagement with said threaded element for threading adjustment thereon, said means being movable on its pivot to a position so that said members may assume relatively spaced positions with their threaded portions out of engagement with said threaded element, so that the appliance may be quickly moved endwise off the threaded element.

GEORGE W. OAKES